US012566325B2

(12) United States Patent
Badri

(10) Patent No.: US 12,566,325 B2
(45) Date of Patent: Mar. 3, 2026

(54) APPARATUS PROVIDING REPEATABLE REGISTRATION BY ALIGNING OBJECTS TO BE IMAGED

(71) Applicant: S Amirdin Badri, Chicago, IL (US)

(72) Inventor: S Amirdin Badri, Chicago, IL (US)

( * ) Notice: Subject to any disclaimer, the term of this patent is extended or adjusted under 35 U.S.C. 154(b) by 374 days.

(21) Appl. No.: 18/309,319

(22) Filed: Apr. 28, 2023

(65) Prior Publication Data

US 2024/0361585 A1 Oct. 31, 2024

(51) Int. Cl.
*G02B 21/36* (2006.01)
*G02B 21/26* (2006.01)
*G02B 21/34* (2006.01)

(52) U.S. Cl.
CPC ........... *G02B 21/365* (2013.01); *G02B 21/26* (2013.01); *G02B 21/34* (2013.01); *G02B 21/361* (2013.01); *G02B 21/362* (2013.01)

(58) Field of Classification Search
CPC ....... G02B 21/365; G02B 21/26; G02B 21/34
See application file for complete search history.

(56) References Cited

U.S. PATENT DOCUMENTS 3,765,745 A * 10/1973 Burboeck .............. G02B 21/26
359/393
3,951,512 A * 4/1976 Tolles .................... G02B 21/34
359/391

| | | | | |
|---|---|---|---|---|
| 5,367,401 A * | 11/1994 | Saulietis | ................ | G02B 21/26 |
| | | | | 359/398 |
| 5,438,451 A * | 8/1995 | Schweizer | ............. | G02B 21/26 |
| | | | | 359/392 |
| 6,118,582 A * | 9/2000 | Del Buono | ......... | B01L 3/50855 |
| | | | | 359/398 |
| 9,404,864 B2 * | 8/2016 | Handique | .............. | G02B 21/26 |
| 9,581,800 B2 * | 2/2017 | Corwin | .................. | G02B 27/32 |
| 10,088,655 B2 * | 10/2018 | Virk | ........................ | G02B 21/34 |
| 2002/0044347 A1 * | 4/2002 | Steenblik | ........... | G02B 27/0012 |
| | | | | 359/383 |
| 2005/0200981 A1 * | 9/2005 | Kiryu | ..................... | G02B 27/62 |
| | | | | 359/819 |
| 2015/0002834 A1 * | 1/2015 | Fine | ........................ | G01N 33/49 |
| | | | | 359/396 |
| 2016/0370264 A1 * | 12/2016 | Campbell | .............. | G01N 1/312 |
| 2019/0033570 A1 * | 1/2019 | Sakai | ................... | G02B 21/362 |
| 2022/0016624 A1 * | 1/2022 | Daugharthy | ...... | B01L 3/502707 |
| 2022/0269060 A1 * | 8/2022 | Pang | ................. | H04N 1/00541 |
| 2024/0361585 A1 * | 10/2024 | Badri | ................... | G02B 21/362 |

* cited by examiner

*Primary Examiner* — Mustak Choudhury

(57) ABSTRACT

Aligning apparatuses with a set of guides that form at least one imaging region are provided. The guides contain edges for aligning an object to be imaged, where the object is placed in the imaging region. The aligning apparatuses may comprise multiple imaging regions for imaging multiple objects and may also comprise a guard member and a color check guide member. In some examples, the aligning apparatus may be used with a scanner that captures images of the objects and with a computer program for processing the images.

21 Claims, 10 Drawing Sheets

APPARATUS PROVIDING REPEATABLE REGISTRATION BY ALIGNING OBJECTS TO BE IMAGED

BACKGROUND

With the advent of digital imaging, there has been a move to create digital images of physical objects. When creating digital images of a collection of objects such as microscope slides including specimens, it may be desirable to image more than one object together as a group to, for example, reduce the number of imaging operations along with their associated time and expense. However, imaging multiple objects together generally results in a single composite image of multiple objects. In some cases, it may be preferred to store images of individual objects rather than composite images of batches of objects that were imaged together. Creating individual images then may involve either manually separating out the image of each object from the composite image to create an individual image or employing computer programs, sometimes referred to as "cookie cutter programs," that are able to separate out an image of each individual imaged object into a separate file. However, the use of such computer programs for multiple imaging batches generally is dependent upon the objects to be imaged being placed in the same place across imaging batches in order for the computer program to automatically and consistently extract each imaged object from the batches of imaged objects.

For example, it has been known in the prior art to use an aligning apparatus consisting of a flat clear acrylic base with holes drilled into the base. A compressed tubing with a slot cut down the side is inserted into the holes and permitted to expand to fill the holes when scanning microscope slides. A portion of the tubing protrudes from the base, providing a divider between multiple imaging regions into which microscope slides are placed. The prior art device utilized three approximately parallel columns of holes filled with tubing. The three columns were arranged such that the holes filed with tubing of the first and third columns were approximately aligned, and the second, middle column was aligned such that the holes with tubing in the middle column are equidistant between holes of the first and third columns located closer to one edge of the aligning apparatus and holes of the first and third columns located closer to an opposite edge of the aligning apparatus. Each hole with tubing was separated by a space larger than a microscope slide, which allowed the microscope slides within each imaging region to shift out of place. Furthermore, the irregular shape of the compressed tubing provided an ineffective point of contact to align a microscope slide with. This configuration and lack of alignment of the microscope slides did not place object to be imaged in the same location within an imaging region and necessitates manual separation of individual objects from the image of the group of objects.

This disclosure relates generally to a device that permits objects to be maintained in the same location for the easy separation and alignment of objects to be imaged across repeated imaging.

SUMMARY

Aspects of the present disclosure relate to a device for providing repeatable alignment of objects to be imaged.

A device designed to provide the repeatable alignment of objects to be imaged is provided. The apparatus for aligning objects to be imaged comprises a base with a set of guides extending upwards above a top surface of the base. The guides bound imaging regions, into which objects to be imaged are placed. The guides are used to align the placement of the object to be imaged within the imaging region. The guides may be of any suitable shape and the aligning apparatus includes at least one imaging region. In an embodiment, the aligning apparatus contains two or more imaging regions that form a grid of imaging regions.

The aligning apparatus may be used with imaging processes such as scanning or photographing. In the scanning embodiment, the aligning apparatus may further include guard members that extend upwards out of the top surface of the base greater than the guide members in order to bear the weight of the scanner head such that the weight does not damage the guides or disrupt the alignment of the objects to be imaged.

The aligning apparatus may be used in any process involving a high-volume of imaging, for example, the digitalization of large collections of entomological or botanical specimens at a museum, or the digitization of large collections of photographs or negatives.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents. Further, throughout the disclosure, the terms "about", "substantially", and "approximately" mean plus or minus 10% of the number or geometric constraint that each term precedes. For example, about 100 may mean 100+/−10.

As mentioned above, the present disclosure relates generally to an apparatus for use in imaging and a method of using the apparatus to image the contents of the apparatus. The apparatus, also referred to as a "jig," maintains objects to be imaged in an arrangement. Objects to be imaged include microscope slides, specimens, microscope slides including specimens, and the like, as will be described in more detail below. Maintaining one or more groups of objects to be imaged in consistent imaging locations for the easy separation and alignment of the objects to be imaged is a continuing technical challenge for persons who would like to image objects in batches and, optionally, create separate individual images from a composite image of the group of objects.

Figure 1A:
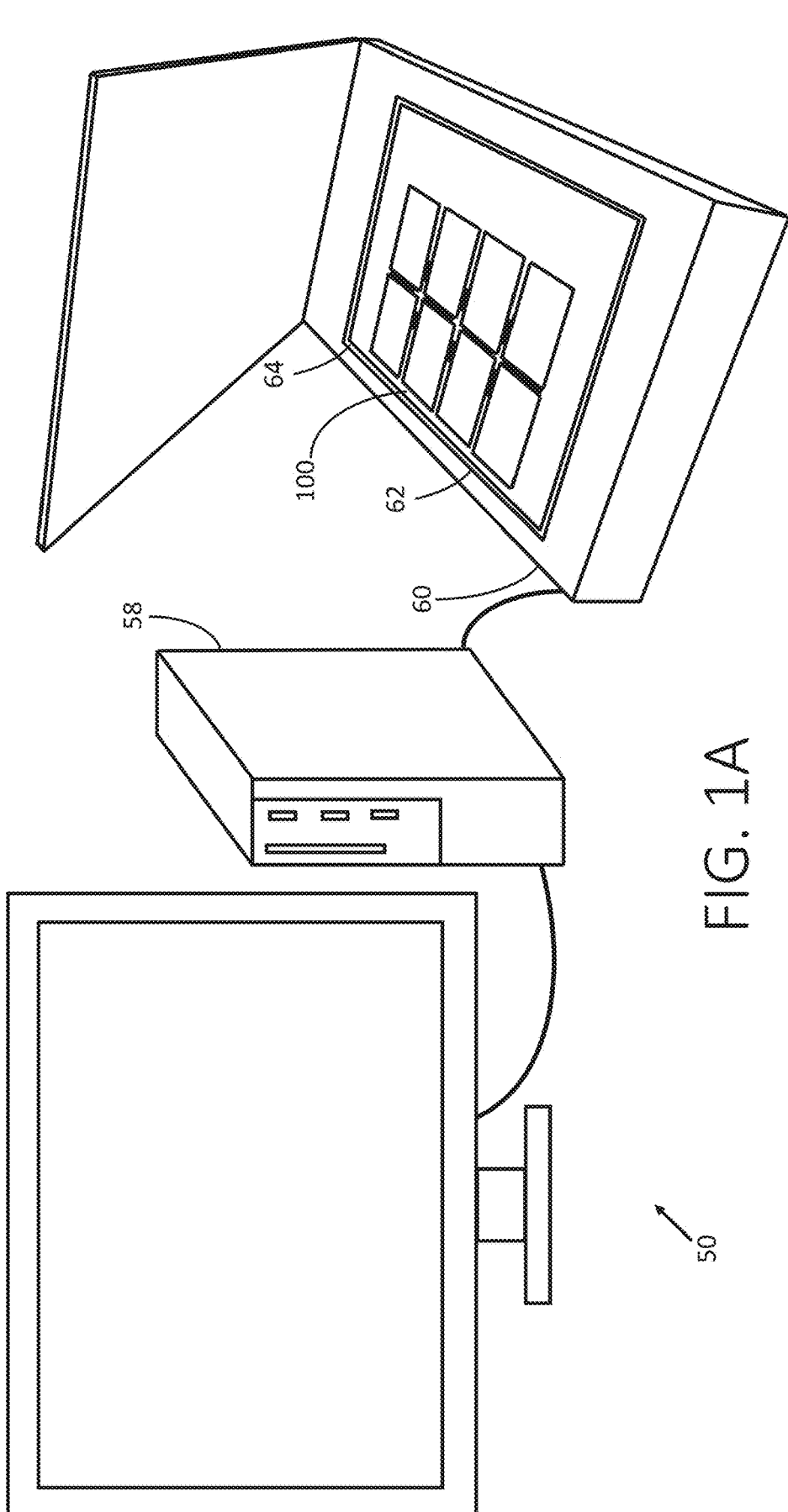
FIG. 1A shows a perspective view of an example system including an example aligning apparatus, in accordance with some aspects of the disclosed subject matter.

FIG. 1A shows an example system 50 including an example aligning apparatus 100, in accordance with some aspects of the disclosed subject matter. The system 50 may include a computer 58, a scanner 60 with a scanner platen 62 and an aligning apparatus 100. The computer 58 and scanner 60 shown herein are merely examples of a suitable computing device and scanner and are not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments, and the like that include the ability to receive image data from the scanner. Likewise, the system may include any scanner or other imaging device suitable for capturing images of physical objects whose positions are maintained by an aligning apparatus as disclosed herein.

Figure 1B:
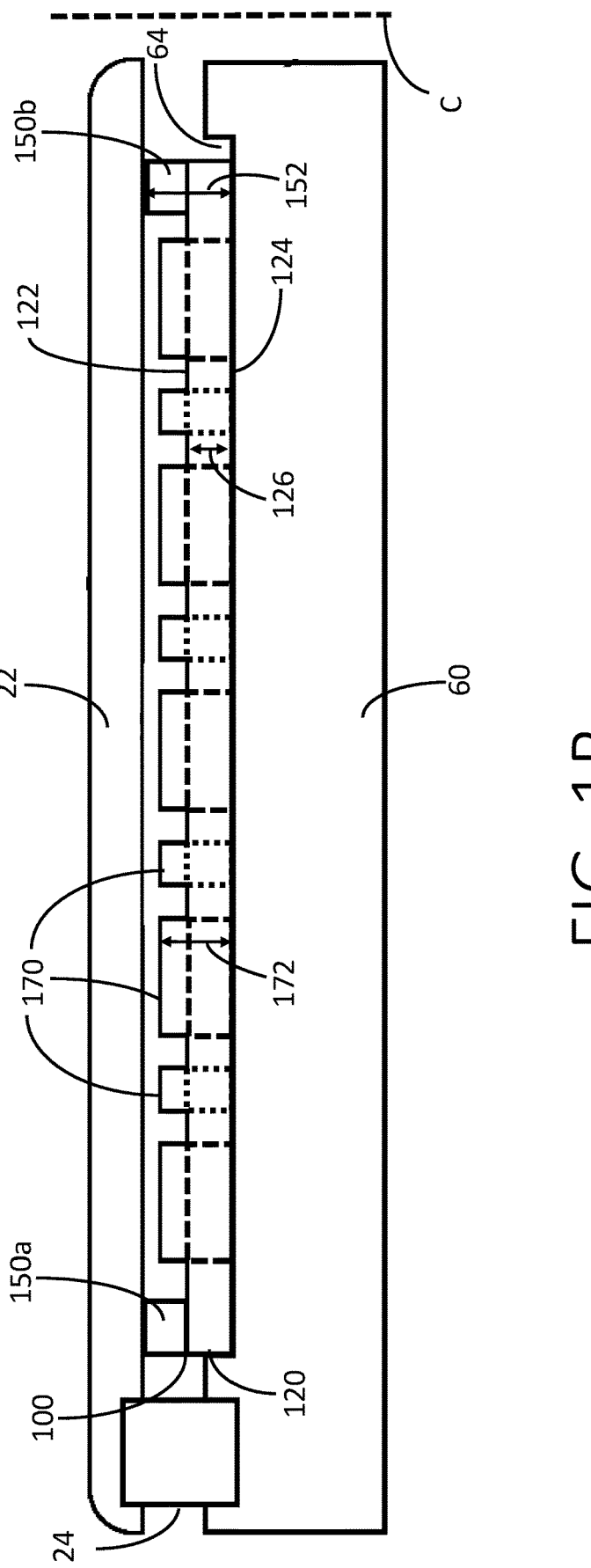
FIG. 1B shows a side-profile cross section of an example aligning apparatus placed on a scanner, according to some aspects described herein.

FIG. 1B shows an example of an aligning apparatus 100, in accordance with some aspects of the disclosed subject matter, for use with a scanner, as illustrated in FIG. 1A. The aligning apparatus 100 comprises a base 120 having substantially flat top and bottom surfaces, 122 and 124, respectively, where the top surface 122 and the bottom surface 124 are separated by a base thickness 126, which extends in a thickness direction (axis C). In an embodiment, the bottom surface 124 is intended to be placed on a scanner platen 62 (see FIG. 1A), which may be located in a well 64 of the scanner 60.

In an embodiment, the base 120 is sufficiently transparent to allow light to pass through the base. The base 120 may be made of any clear material that permits light to pass through that either does not distort or refract, or minimally distorts or refracts the image of an object to be imaged when viewed from below the base, such as cast acrylic, extruded acrylic, glass, or anti-newton glass. In an embodiment where the aligning apparatus 100 is used with a scanner 60 that uses a lid 22 connected to a body of the scanner 60 by a movable joint 24, such as a hinge, the base 120 may have a base thickness 126 that enables both the base 120 to be placed in the well of the scanner and the lid of the scanner to close.

The base 120 may be used with any commercial scanner and may be sized accordingly. In an embodiment, the base 120 has the same width and length as the well 64 of a scanner 60, which allows ease of alignment of the base 120 within the scanner well 64. For example, in an embodiment sized for an Epson Perfection v600 Photo Scanner, the base 120 is 22 cm wide and 30 cm long and has a base thickness 126 thickness of ⅛ inch.

A set of guides 170 extend substantially perpendicular upwards above the top surface 122 of the base 120. The guides 170 need not be formed from the same material as the base 120 and need not be transparent. The guides 170 have a guide height 172, which extends in the thickness direction, along axis C. In an embodiment, the guide height 172 may be ⅛ of an inch, so the guides 170 extend ⅛ of an inch above the top surface 122 of the base 120. The set of guides 170 may also be partially recessed into the base 120 such that they do not extend their full height above the top surface 122 of the base 120, as is discussed in more detail below. As further discussed below, the guides 170, also referred to as pegs, are arranged to bound a set of imaging regions.

Figure 2A:
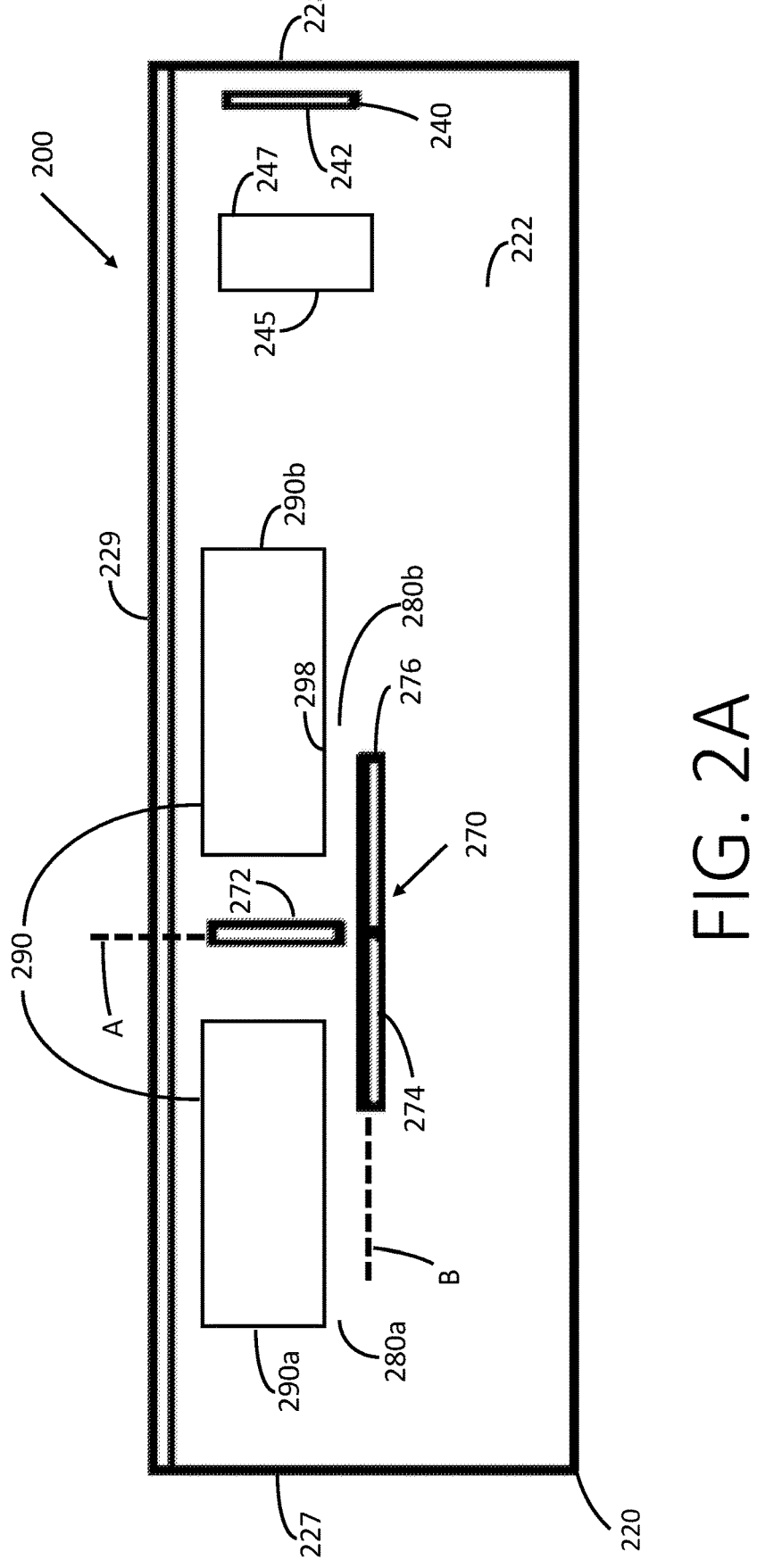
FIGS. 2A through 2C show partial top-down views of an example aligning apparatus, according to some aspects described herein.

FIG. 2A shows a partial top-down view of the base 220 of example aligning apparatus 200, in accordance with some aspects of the disclosed subject matter. As shown in FIG. 2A, guides 272-276 are arranged to form imaging regions 280a, 280b of repeatable registration. Each imaging region 280a, 280b may receive an object to be imaged 290 (i.e., objects 290a, 290b). In the example aligning apparatus 200, an imaging region 280a is bounded by at least a first guide 272 and second guide 274 of the set of guides 270, wherein the first guide 272 extends along a first axis A, and the second guide 274 extends along a second axis B that is at a substantially perpendicular angle to the first axis A. As shown in FIG. 2A, in an embodiment, the first axis A may extend vertically across the top surface 222 of base 220, that is, the first axis A extends parallel to a left side edge 227 and a right side edge 228 of the base 120, and the second axis B may also extend horizontally across the top surface 222 of base 220, that is, parallel to the top side edge 229 and bottom side edge (not shown) of base 220. The thickness direction (axis C, not shown) extends into and out of the page and is perpendicular to a plane on which the first axis A and second axis B extend.

Figure 2B:
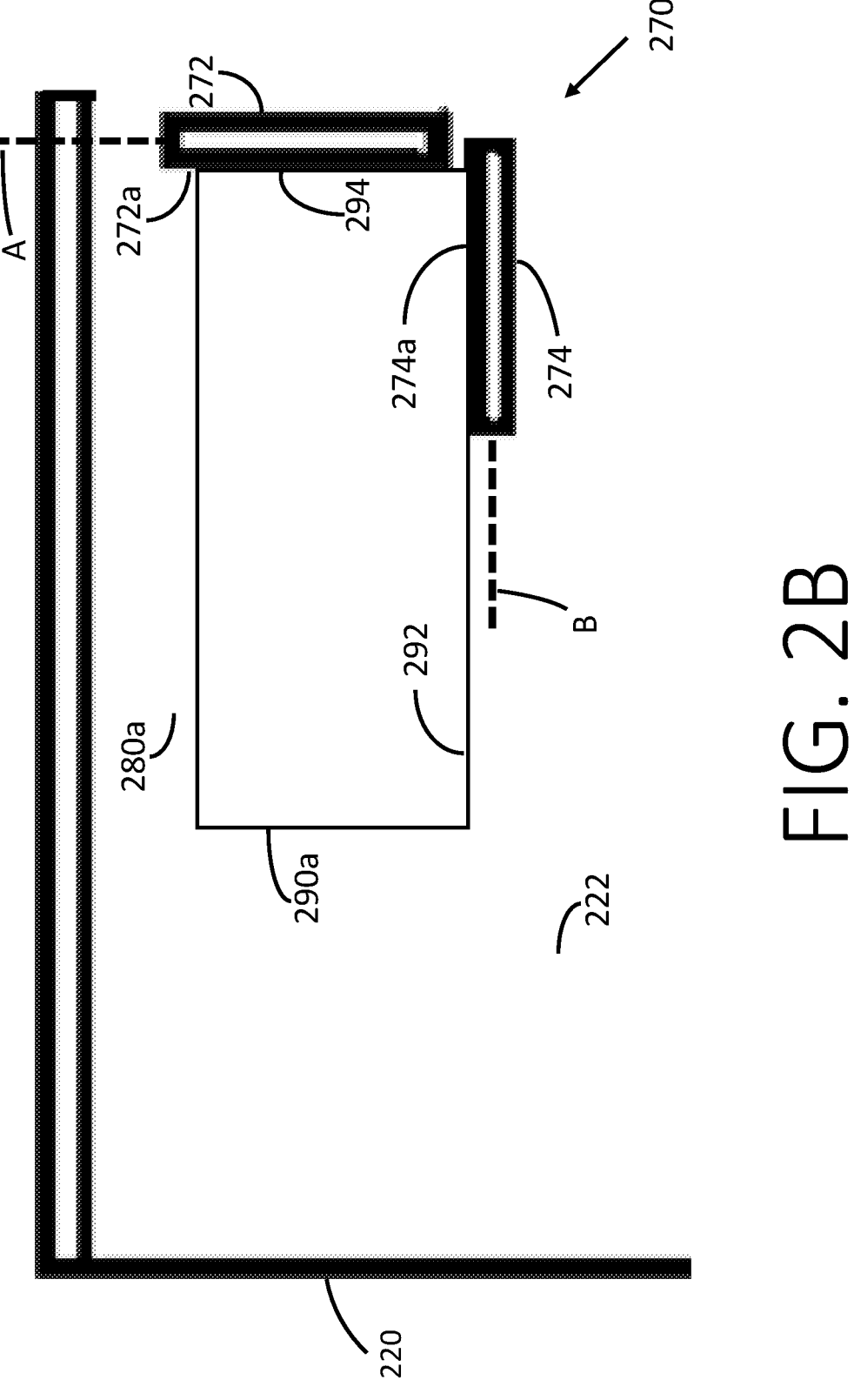

The guides 272-276 "guide" the location of each object to be imaged 290 (i.e., objects 290a, 290b) within each imaging region 280a-280b by comprising at least one guide side edge suitable for positioning an object against it. For example, as shown in FIG. 2B, which shows a magnified top-down view centered on imaging region 280a, a first edge 292 and second edge 294 of a microscope slide 290a (i.e., an object to be imaged 290) may be arranged against corresponding edges of guides 272a and 274a. By positioning each object to be imaged 290 substantially against the set of guides 270, during a high-volume imaging of objects included on the aligning apparatus 200, each imaged object 290 will be located in the same location in a first image as another object placed in the same imaging region will be located in a second image. That is, each imaging region 280 will be located in the same location, and thereby each object to be imaged 290, such as a microscope slide, will be located in the same location, over multiple repeated images. The repeatable registration quality of the aligning apparatus 200 will be described in more detail below. The guides may be arranged in any manner in which the objects to be imaged will consistently be in the same location, allowing for repeatable registration, as will be discussed in more detail below.

As noted, the aligning apparatus 200 may comprise multiple imaging regions. For example, as shown in FIG. 2A, the aligning apparatus may comprise imaging regions 280a and 280*b*. The set of guides 270 may further comprise a third guide 276 arranged along the second axis B and for positioning a second edge 298 of a second object to be imaged 290*b*, such as microscope slide, wherein the first guide 272 and third guide 276 of the set of guides 270 define an imaging region 280*b*. In an embodiment, the second guide 274 and third guide 276 do not contact each other along the second axis B. In another embodiment, the second guide 274 and third guide 276 may be formed from a single piece or may be formed from two separate pieces that contact each other along the second axis B. An embodiment where the second guide 274 and the third guide 276 are formed from two separate pieces but contact each other is shown in FIG. 2A.

Figure 2C:
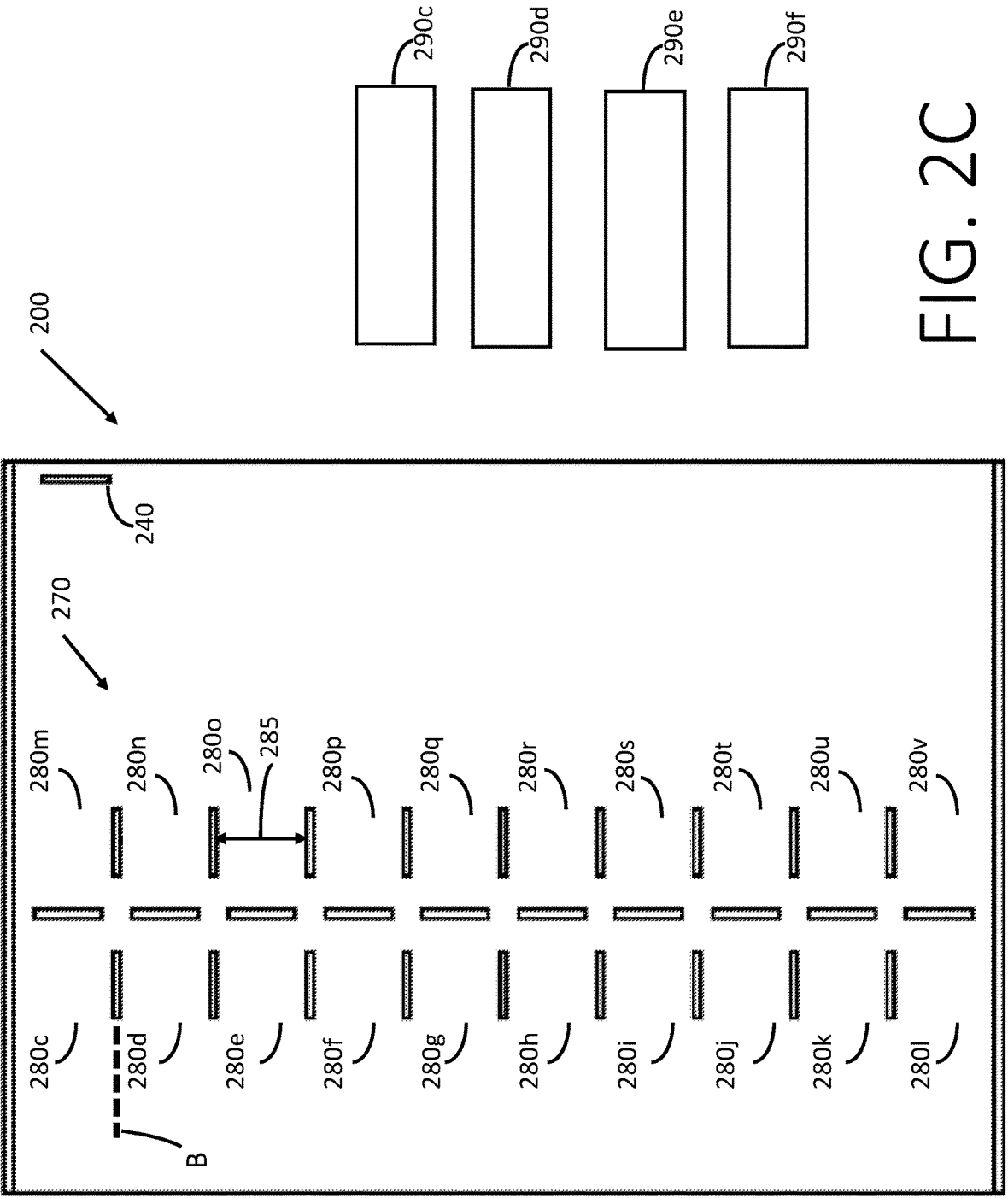

The arrangement of the set of guides 270 on the aligning apparatus 200 may be designed to form a grid of imaging regions 280, as shown in FIG. 2C, which may be used, for example, for arranging multiple microscope slides, shown as object to be imaged 290*c*-290*f*, in any of imaging regions 280*c*-280*v*. In the example aligning apparatus 200 shown in FIG. 2C, each guide of the set of guides 270 are not in contact with any other guide along any axis. In this embodiment, each imaging region has a spacing 285. The imaging region spacing 285 has a minimum distance, which permits the objects to be imaged to be inserted into each imaging region 280. In one example of an aligning apparatus where the objects to be imaged are standard microscope slides, the spacing 285 may be approximately 2.7 cm (1.063 inches), providing just enough clearance for standard microscope slides (3 inches long by 1 inch tall), such as 290*c*-290*f* to be inserted into the imaging region. In an embodiment, the aligning apparatus comprises two columns of ten imaging regions each, wherein each imaging region is divided from the adjacent imaging region to the top or bottom or side by a guide.

In other embodiments, the set of guides 270 may extend along entirely parallel axes, for example, only falling on axis B of FIG. 2C and parallel axes. In such embodiments, the objects to be imaged 290 are aligned using guides located on one side of each object to be imaged alone, or the objects to be imaged may be aligned by abutting the object against the guides on two opposite sides of the object.

The arrangement of the set of guides 270 on the aligning apparatus 200 may be modified to accommodate objects of other shapes. For example, instead of arranging the guides 270 to bound a grid of rectangle-shaped imaging regions 280, the guides may instead be arranged to bound curved imaging regions, such as for petri dishes, or to bound the shape of any other object to be imaged. The guides 270 may be any suitable design, including rectangular, as shown in FIGS. 2A through 2C, as well as square or circular shapes, and may be of other designs in order to fit more unique shapes of the object to be imaged, such as those shown in FIGS. 3A through 3D. In one embodiment of the example aligning apparatus shown in FIG. 2C, the guides are rectangular, between 0.2 and 0.3 cm wide and 2 cm long, and form a grid of imaging regions for microscope slides.

Figure 3A:
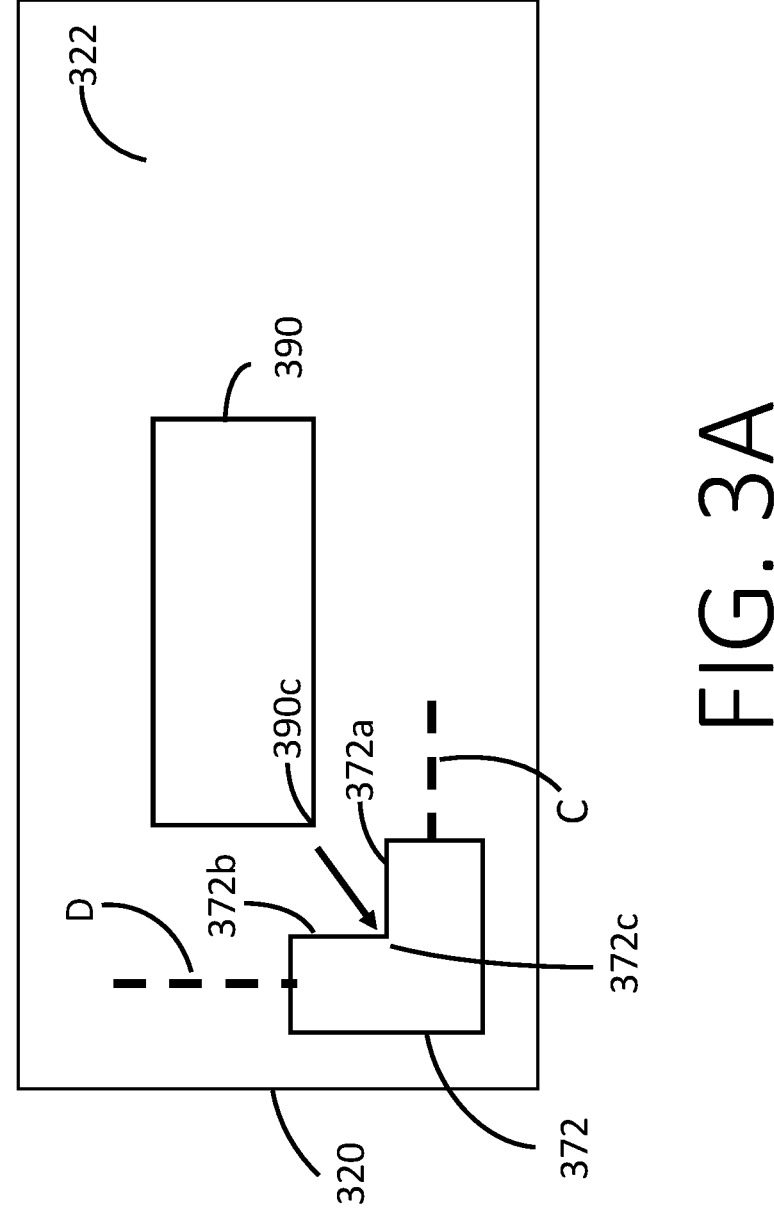
FIGS. 3A through 3D show partial top-down views of alternative configurations of guides for an aligning apparatus, according to some aspects described herein.

For example, as shown in the partial top view in FIG. 3A, the guides 372 may be corner-shaped guides with a first guide portion 372*a* and a second guide portion 372*b* that extend upwards above the top surface 322 of the base 320 and which form an approximately 90-degree corner 372*c*, with the first guide portion 372*a* extending along a first axis C and the second guide portion 372*b* extending along another axis perpendicular to the first axis D, as shown in FIG. 3A. In this example, an object to be imaged 390 that has approximately 90-degree corner edges may be aligned with the guide 372 by positioning a corner 390*c* of the object 390 into a corner 372*c* formed by the guide portions 372*a* and 372*b* of the guide 372.

Figure 3B:
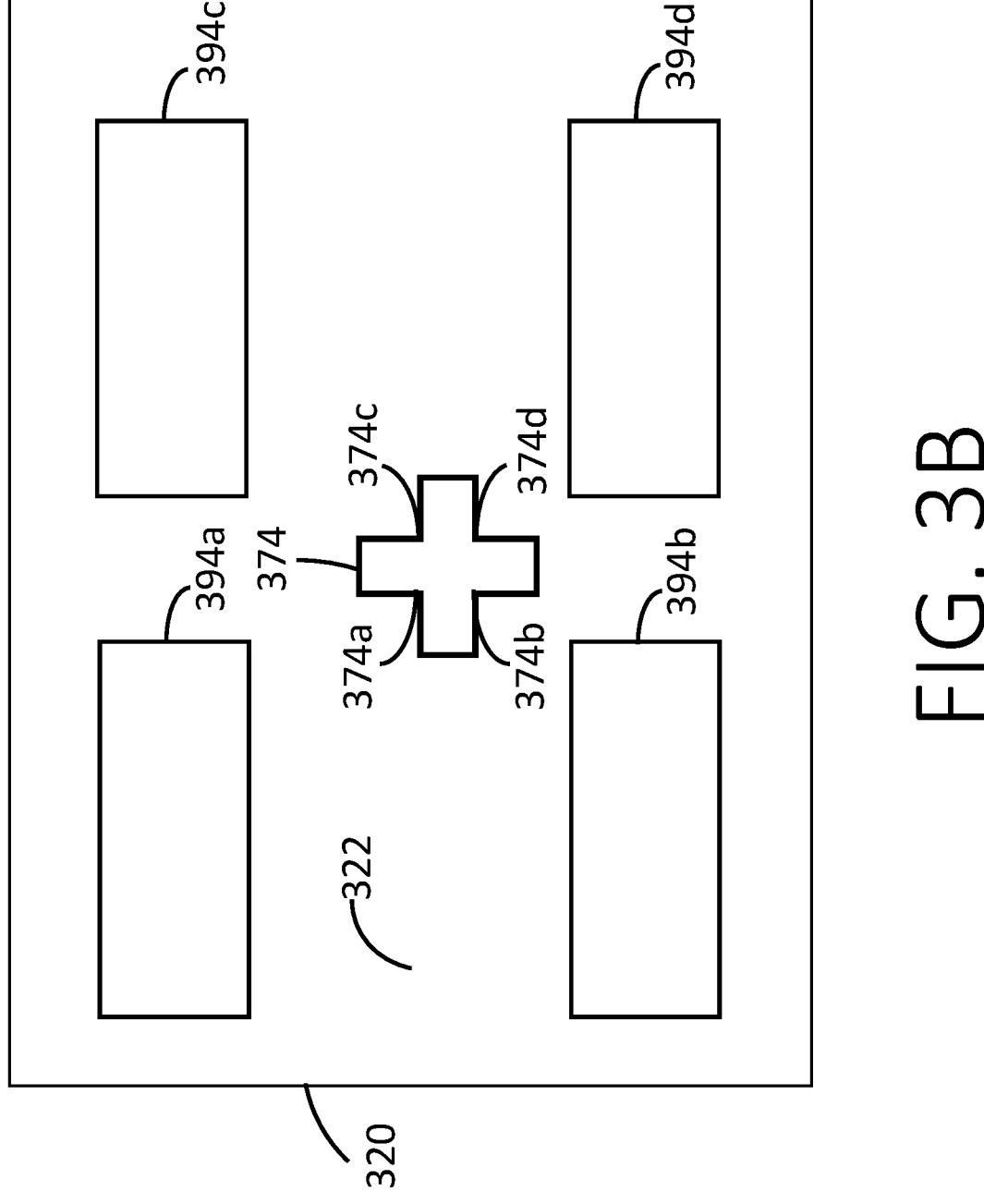

In another example, as shown in the partial top view in FIG. 3B, the guide 374 may be cross-shaped and form four corners 374*a*-374*d* into which four objects to be imaged 394*a*-394*d*, such as microscope slides with corners, may be positioned.

Figure 3D:
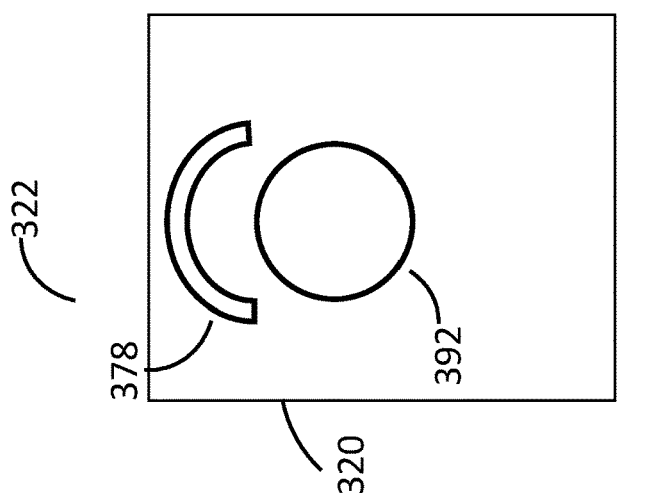
Figure 3C:
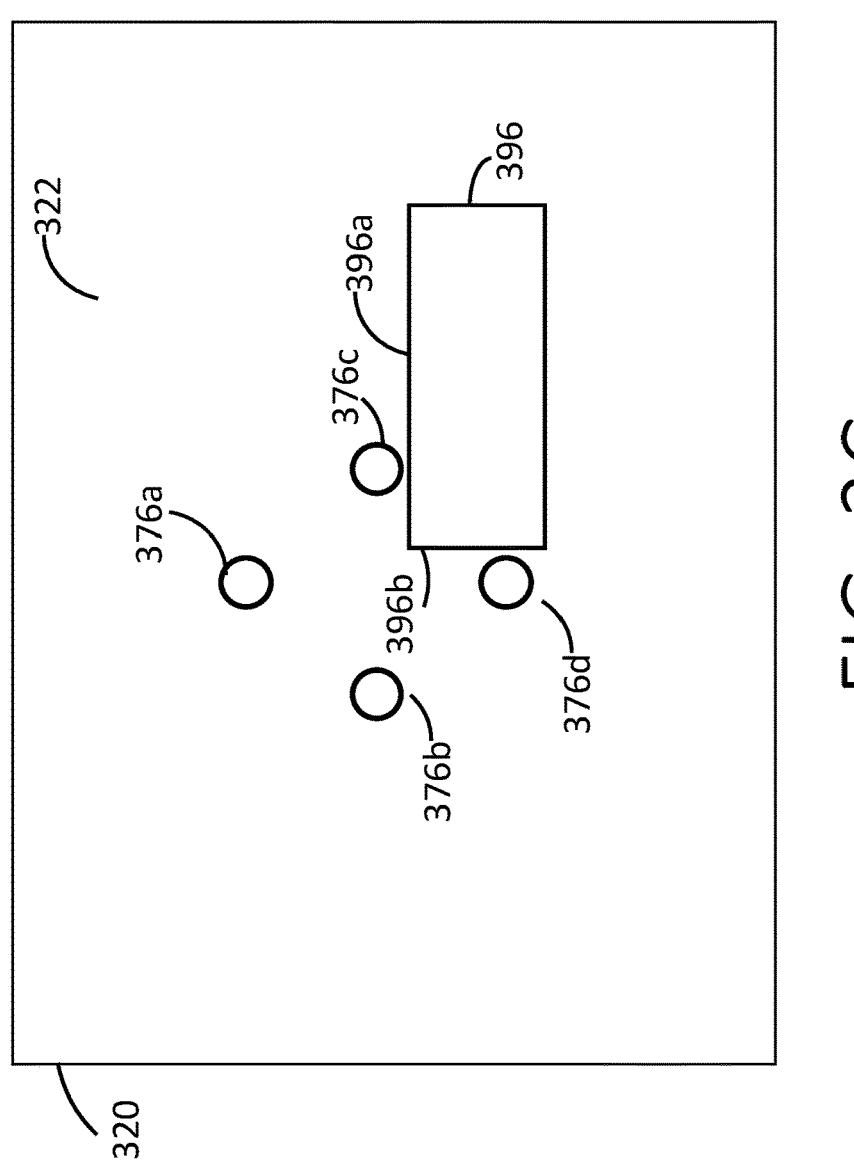

In another example shown in the partial top view in FIG. 3C, guides 376*a*-376*d* have a circular cross section. An object to be imaged 396 may be aligned by abutting a first edge 396*a* of an object to be imaged 396 against guide 376*c* and a second edge 396*b* of the object 396 against guide 376*d*. The guides 376*a*-376*b* may also be any other suitable geometric shape.

In other examples, the guides may be designed to form at least a partial negative image of the outer edge of an object to be imaged, for example, the guide 378 is curved in order to accommodate a circular object, such as petri dish 392, as shown in the partial top view in FIG. 3D. In other embodiments, the guides may form a complete negative of the outer edge of an object to be imaged.

As shown in the example aligning apparatus 200 of FIGS. 2A and 2C, the base 220 may further comprise a color check card guide 240 extending upwards above the top surface 222 of the base 220. A color check card 245 permits image capture and/or editing software to tune the colors of a captured image by presenting a known color for use as a baseline. The color check card guide 240 has at least one edge 242 that an edge 247 of the color check card 245 may be aligned against. The color check card guide 245 may be placed anywhere along the top surface 222 of the base 220. In the example aligning apparatus 200 of FIG. 2, the color check card guide 240 is shown located in an upper corner of the aligning apparatus 200.

Referring again to FIGS. 1A and 1B, in an embodiment, the base 120 may also include at least one guard member 150 that extends perpendicularly upwards above the top surface 122 of the base 120. The guard member 150 extends upwards above the top surface 122 of the base 120 to a guard member height 152 of the guard member 150 in the thickness direction (on axis C), which is greater than the guide member height 172. In this manner, where the method of imaging is scanning, the guard member 150 protects the base 120, guides 170, and object(s) to be imaged (not shown) from the weight of a lid 62 of a scanner 60 pressing down on these features and disturbing the arrangement of objects or damaging the guides 170. The guard member(s) 150 may be positioned anywhere on or adjacent to the base 120. In an embodiment, the guard member 150 comprises guard member portions 150*a* and 150*b*, which are positioned on opposite ends of the base 120 from each other, and the guard member 150 extends greater than ⅛ inch up above the top surface 122 of the base 120 in the thickness direction, along axis C. The guard member 150 may alternatively extend in a continuous manner along an edge of the base 120, or may extend as a series of segments along at least a portion of an edge of the base 120. In an alternative embodiment, the guides or certain guides may act as the guard member(s). In one embodiment, the guard member 150 may be formed with the base 120. In another embodiment, the guard member 150 may be formed of separate from the base 120 and may be disposed and/or affixed on the top surface 122 of the base 120. In yet another embodiment, the guard member 150 may be formed of separate from the base 120 may be inserted and/or affixed into a channel formed into the base 120, as discussed in more detail below.

The base, guides, and guard members of the various aligning apparatuses disclosed herein may be made as one solid piece by any suitable process for forming solid materials, such as casting, mold-injection, 3D printing, extruding, continuous casting, thermoforming, vacuum forming, compression molding, or blow molding. Alternatively, the base, guides, and guard members of the various aligning apparatuses disclosed herein may be made as separate components that are assembled together.

Figure 4:
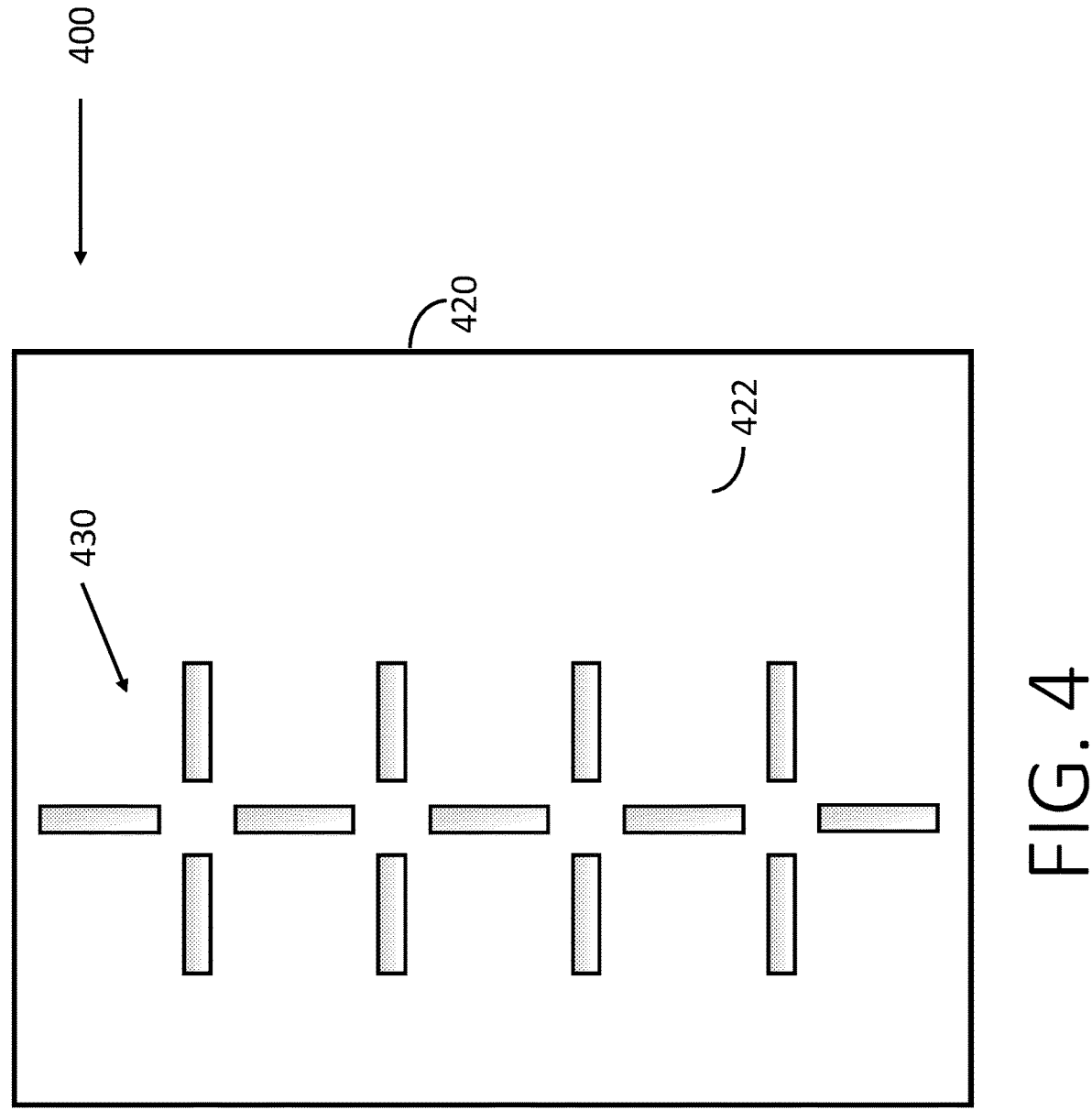
FIG. 4 shows an example base in an example aligning apparatus, according to some aspects described herein.

For example, as shown in FIG. 4, a base 420 of an example aligning apparatus 400, in accordance with some aspects of the disclosed subject matter, may be formed from acrylic with a set of channels 430 cut into the base 420 at the desired locations of the guides (not shown) or guards (not shown) by any process, including laser cutting. The channels 430 intersect the top surface 422 of the base 420 and may extend downward (from the top surface 422 of the base) and partially through the base 420 or alternatively may extend downward through the entirety of the base 420. The guides (not shown) may then be inserted into the channels 430. In an example aligning apparatus 400 in which the channels 430 do not extend through the entirety of the base 420, the guides may be between ⅛ and ¼ inch in height, such that the guides extend no more than ⅛ inch upwards above the top surface 422 of the base 420. In an example aligning apparatus 400 in which the channels 430 extend through the entirety of the base 420, the ends of the guides distal from the top surface 422 of the base 420 are flush with the bottom surface (not shown) of the base 420. In this example, the guides are ¼ inch in height and, when inserted into the channels, extend ⅛ inch upwards above the top surface 422 of the base 420. This same procedure may be used to attach the guards (not shown) to the base.

FIG. 4 shows an example base in an example aligning apparatus, according to some aspects described herein, wherein the base and guides are not assembled as one solid piece and the base contains channels into which the guides are placed. In various embodiments of aligning apparatuses in accordance with some aspects of the disclosed subject matter, channels (such as the channels 430 of FIG. 4) are cut into the base (such as the base 420 of FIG. 4) sufficiently narrowly so as to tightly fit the guides (not shown) and thereby secure the guides in place. Alternatively, if a more permanent and tight fight is desired between the channels 430 and the guides, the guides may be glued into place, with, for example, a Weld-On #4 glue, or any other glue with sufficient viscosity to permeate the small cracks left in the channels between the base 420 and the inserted guides.

The various example aligning apparatuses, in accordance with some aspects of the disclosed subject matter, comprising the base, guides, and imaging regions permit repeatable imaging of objects placed in the imaging regions by maintaining the location of objects to be imaged in constant locations. By maintaining the locations of imaged objects across multiple images of the base, and thereby providing repeatable registration, further analysis of the images of the base including its objects may be easier and more efficient. For example, the aligning apparatus may be utilized in conjunction with a computer program, such as Inselect™, that receives a composite image including images of the objects on the aligning apparatus and processes the composite image to create a separate image and corresponding image file for each imaged object based on the consistent locations of each imaging region. By maintaining the guides and imaging regions in the same place, the image processing is significantly improved. For example, images of numerous physical objects may be captured in batches with minimal, if any, need to individually select areas of composite images to save as separate files so that objects may be imaged more quickly and more accurately.

The aligning apparatus may be used in any instance that requires repeatable registration. The imaging process may image either the object to be imaged, or the object-to-be-imaged in a holder.

For example, the objects to be imaged may include microscope slides including specimens, such as biological, botanical, or entomological specimens. In accordance with some aspects of the disclosed subject matter, various examples of the aligning apparatus may also be used to image: scientific specimens contained on slides and scientific specimens not contained on slides, such as leaves, lichen, or molds. The slides, or other objects to be imaged, may also include further information relating to the slide or the object to be imaged thereon. While information of any type may be included, by way of example, in an embodiment where the aligning apparatus is used to image objects of a biological nature, the information may include the collection date of the specimen, the digitization date, geographic origin of the specimen, the name of the individual who collected the specimen, or taxonomical information relating to the specimen. This permits the user to determine as many or as few details relating to the specimen to include in the captured image to be captured.

In various embodiments, the aligning apparatus may be used to arrange printed material, photos, other non-standard documents (such as, index cards, tickets, baseball cards) or sewing patterns, or may be used to image any other object that would benefit from being imaged in a repeatable registration format.

Figure 5B:
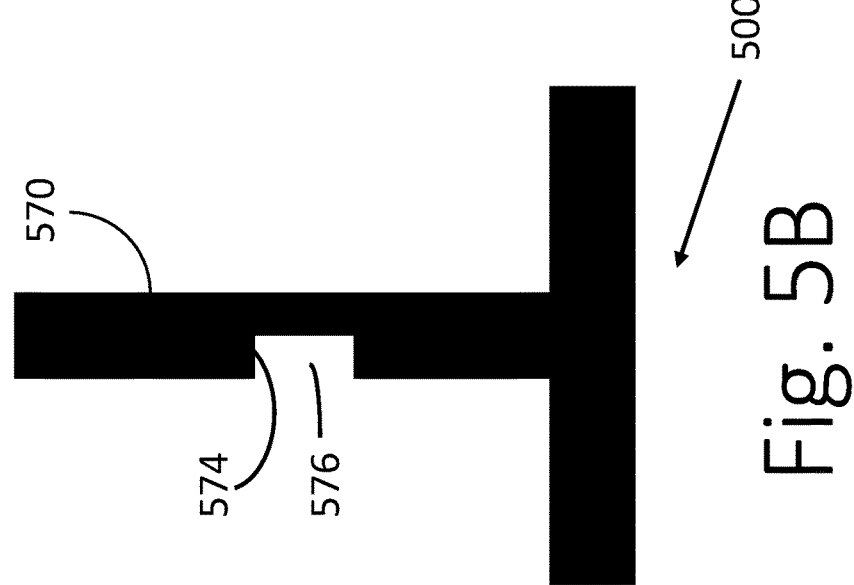
FIGS. 5A and 5B show further examples of configurations of guides for an aligning apparatus, according to some aspects described herein.
Figure 5A:
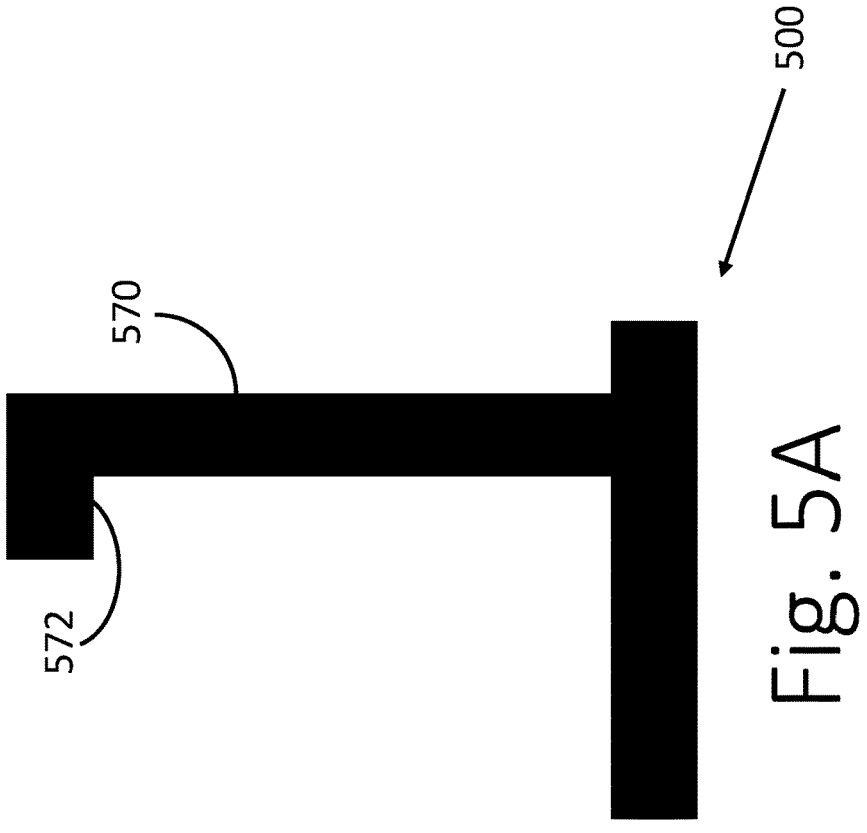

FIGS. 5A and 5B show an example aligning apparatus 500 in accordance with some aspects of the disclosed subject matter, wherein the guides further comprise features for holding objects down in the imaging regions described herein. FIG. 5A shows an embodiment comprising overhangs 572 formed at a top of a guide 570, and FIG. 5B shows an embodiment comprising an overhang 574 formed by an inlet gap 576 in the guide 570 into which an edge of an object to be imaged (not shown) may be inserted. In an alternative embodiment, the guides may further comprise slots cut into the sides of the guides designed for the sides of the object to be imaged to be inserted into, in order to lock the object to be imaged in place or hold down the object to be imaged. The guides containing such structures, including those shown in FIGS. 5A and 5B, are referred to herein as retaining guides As mentioned above, the aligning apparatuses described herein may be imaged by a number of processes, such as scanning or photographing.

A method of using the aligning apparatus comprises: loading the aligning apparatus with objects to be imaged, such as microscope slides; placing the aligning apparatus including the objects on a scanner; and imaging the contents of the aligning apparatus. In separate software, the image of the objects may then be subdivided into separate images, each image containing a single object. Upon removal of the imaged objects, this method may be repeated.

What is claimed is:

1. An apparatus for use in aligning an object to be imaged, the object to be imaged including a specimen to be imaged, the apparatus comprising:

a transparent base comprising a top surface and a bottom surface opposite the top surface in a thickness direction of the transparent base;

a set of guides for positioning an object to be imaged on the top surface of the transparent base, wherein the set of guides extend substantially perpendicularly upwards from the top surface of the transparent base in the thickness direction;

wherein the set of guides comprises a first guide arranged along a first axis for positioning a first edge of the object, and a second guide for positioning a second edge of the object, wherein the second guide is arranged along a second axis that is substantially perpendicular to the first axis, wherein the thickness direction is perpendicular to both the first axis and the second axis, and wherein the first and second guides of the set of guides define an imaging region.

2. The apparatus of claim 1, wherein the first guide is further arranged for positioning a first edge of a second object, the set of guides further comprises a third guide arranged along the second axis and for positioning a second edge of the second object, wherein the first and third guides of the set of guides define a second imaging region.

3. The apparatus of claim 2, wherein the second and third guides are one of i) formed of a single piece arranged along the second axis, ii) formed of separate, contacting pieces arranged along the second axis, or iii) formed of separate, non-contacting pieces arranged along the second axis.

4. The apparatus of claim 1, further comprising a guard member extending substantially perpendicular upwards above the top surface of the transparent base, wherein a height of the transparent based and a height of the guard member form a first height, wherein the height of the transparent base and a height of the set of guides extend form a second height, and wherein the first height is greater than the second height.

5. The apparatus of claim 1, wherein the first axis extends vertically across the base and wherein the second axis extends horizontally across the transparent base.

6. The apparatus of claim 1, further comprising a grid of imaging regions, wherein each imaging region of the grid of imaging regions is defined by additional guides of the set of guides.

7. The apparatus of claim 1, wherein one or more guides of the set of guides is a retaining guide.

8. The apparatus of claim 1, further comprising a color check guide that extends substantially perpendicularly upwards above the top surface of the base, wherein the color check guide has a first edge for positioning a color check card.

9. The apparatus of claim 1, wherein the object to be imaged is a microscope slide.

10. The apparatus of claim 1, wherein the object to be imaged is a petri dish.

11. The apparatus of claim 1, wherein the set of guides extend substantially perpendicularly upwards directly from the top surface of the transparent base in the thickness direction.

12. An apparatus for use in imaging a microscope slide, the apparatus comprising:

a transparent base comprising a top surface and a bottom surface opposite the top surface in a thickness direction of the transparent base;

a set of guides for positioning a microscope slide to be imaged on the top surface of the transparent base, wherein the set of guides extend substantially perpendicularly upwards from the top surface of the transparent base in the thickness direction;

wherein the set of guides comprises a first guide extending along a first axis, and at least one second guide, wherein the at least one second guide extends along a second axis that is substantially perpendicular to the first axis; and wherein the thickness direction is perpendicular to both the first axis and the second axis; and at least two corners formed by at least one intersection of the first guide and the second guide, wherein each corner has a substantially right angle for aligning a microscope slide.

13. The apparatus of claim 12, wherein the first guide is further arranged for positioning a side edge of a second microscope slide, the set of guides further comprises a third guide arranged along the second axis and for positioning a bottom edge of the second microscope slide, wherein the first and third guides of the set of guides define a second imaging region.

14. The apparatus of claim 13, further comprising a grid of imaging regions, wherein each imaging region of the grid of imaging regions is defined by additional guides of the set of guides.

15. The apparatus of claim 12, further comprising a guard member extending substantially perpendicular upwards above the top surface of the transparent base, wherein a height of the transparent based and a height of the guard member form a first height, wherein the height of the transparent base and a height of the set of guides extend form a second height, and wherein the first height is greater than the second height.

16. The apparatus of claim 12, wherein the transparent base is made of an acrylic.

17. The apparatus of claim 12, wherein the first axis extends vertically across the base and wherein the additional axes extend horizontally across the base.

18. The apparatus of claim 12, wherein the apparatus for aligning a microscope slide to be imaged fits within the well of a scanner.

19. The apparatus of claim 12, further comprising a color check guide that extends substantially perpendicularly upwards above the top surface of the base, wherein the color check guide has a first edge for positioning a color check card.

20. The apparatus of claim 12, wherein the base further comprises a series of channels that extend downwards from the top surface of the base and the channels are sized to tightly fit the bottom side of the guides.

21. An apparatus for use in aligning an object to be imaged, the object to be imaged including a specimen to be imaged, the apparatus comprising:

a transparent base comprising a top surface and a bottom surface opposite the top surface in a thickness direction of the transparent base;

a set of channels extending through the base from the top surface to the bottom surface, wherein the set of channels comprises a first channel arranged along a first axis and a second channel arranged along a second axis that is substantially perpendicular to the first axis, wherein the thickness direction is perpendicular to both the first axis and the second axis;

a set of guides tightly fit into the set of channels for positioning an object to be imaged on the top surface of the transparent base, comprising a first guide tightly fit into the first channel for positioning a first edge of the object, and a second guide tightly fit into the second channel for positioning a second edge of the object, wherein the set of guides extend from inside the set of channels substantially perpendicularly upwards from the top surface of the transparent base; and wherein the first guide tightly fit in the first channel and the second guide tightly fit in the second channel of the set of guides define an imaging region.

* * * * *